United States Patent
Bickerstaff

(10) Patent No.: US 6,797,218 B1
(45) Date of Patent: Sep. 28, 2004

(54) METHOD FOR SHRINKWRAPPING

(76) Inventor: Othell Bickerstaff, 25188 Telegraph Rd., Brownstown, MI (US) 48134

(*) Notice: Subject to any disclaimer, the term of this patent is extended or adjusted under 35 U.S.C. 154(b) by 0 days.

(21) Appl. No.: 09/512,434

(22) Filed: Feb. 25, 2000

Related U.S. Application Data

(60) Provisional application No. 60/123,672, filed on Mar. 9, 1999.

(51) Int. Cl.⁷ ......................... B29C 61/02; B29C 63/40
(52) U.S. Cl. ...................................... 264/230
(58) Field of Search .................. 264/230, 238

(56) References Cited

U.S. PATENT DOCUMENTS

| | | | | |
|---|---|---|---|---|
| 4,247,509 A | * | 1/1981 | Talbot | 264/230 |
| 4,763,783 A | * | 8/1988 | Talbot | 206/335 |

FOREIGN PATENT DOCUMENTS

| | | | |
|---|---|---|---|
| DE | 4039276 A1 | * | 6/1992 |
| WO | WO-9749539 A1 | * | 12/1997 |

* cited by examiner

*Primary Examiner*—Leo B. Tentoni
(74) *Attorney, Agent, or Firm*—The Weintraub Group, PLC

(57) ABSTRACT

A re-usable shrinkwrap material is defined by a shrinkable material capable of retaining its shape after shrinking. A releasable fastener, such as a zipper, hook and loop fastener or the like is secured to the material and is used to secure the material to an article to be sealed prior to the shrinking thereof. The material is a pre-formed shell which loosely conforms to the shape of the article to be sealed prior to being applied thereover. After shrinking, the shell can be removed by releasing the means for fastening or releasable fastener. Since the shell retains its shape it can then be re-used at a later date by applying it anew over the article and re-fastening together the means for releasing.

8 Claims, 1 Drawing Sheet

METHOD FOR SHRINKWRAPPING

CROSS-REFERENCE TO RELATED APPLICATIONS

This application is a completion application of co-pending provisional application Ser. No. 60/123,672 for "Reusable Shrinkwrap Material and Method Of Use Therefor", filed Mar. 9, 1999, the disclosure of which is hereby incorporated by reference.

BACKGROUND OF THE INVENTION

1. Field of the Invention

The present invention relates to shrinkwrap materials. More particularly, the present invention pertains to shrinkwrap materials and methods of use therefor. Even more particularly, the present invention concerns reusable shrinkwrap materials and methods of use therefor.

2. Prior Art

As is known to those skilled in the art to which the present invention pertains the "shrinkwrapping" of various articles of manufacture is an ever evolving and growing technique for sealing various articles of manufacture from the elements as well as from undesirable environments. What is essentially involved in shrinkwrapping an article, regardless of the type of shrinkwrapping material used, is that the shrinkable material, such as a plastic sheet, ordinarily comprising a polyolefin, is secured to an article to be sealed by enveloping it around the article and securing it thereto via ropes, tape, or the like. After securing the shrinkable material to the article to be sealed, heat, below the melting point of the shrinkwrap material, is then applied thereto. The heat causes the shrinkwrap material, which is usually defined as a film, to "shrink" and, therefore, tightly conform to and engage those areas of the article against which the film abuts to thereby "seal" the article. Upon shrinking, essentially, an airtight seal is imparted to the article.

The shrinkwrapping of articles, as noted above, has long been known and is well exemplified in the prior art. For example, in U.S. Pat. No. 4,247,509, there is disclosed a method of shrinkwrapping a boat. Furthermore, in U.S. Pat. No. 4,763,783, there is disclosed a unique approach to the shrinkwrapping of aircraft, such as helicopters, etc. Furthermore, it is known to shrinkwrap vehicles, appliances and similar type articles.

The types of materials which are used in practicing shrinkwrap methods varies from simply a plain film to laminates of film having a woven or non-woven fabric secured thereto via an adhesive which forms an intermediate layer therebetween. Typically, hot melt adhesives are used to secure the fabric to the film. Again, the type of material is well known in the art. For example, in the above-cited U.S. patents there is disclosed a shrinkable polyolefin film, such as a polyethylene sheet having certain additives incorporated therewith such as UV inhibitors, VCIs, and the like. In addition, in U.S. Pat. Nos. 5,491,017; 5,623,812; 5,705,008; 5,705,566 and 5,342,469 there is disclosed heat shrinkable materials having both a woven or non-woven fabric laminated thereto to form a composite material which may be used to seal an article.

An understanding of the prior art makes it abundantly clear that once the sealed article has the shrinkwrap material removed from it, after shrinking, the shrinkwrap material or film or heat shrink material is of no further use and, therefore, must, necessarily, be discarded. In other words, the heat shrink material is a one time use product which is discarded after using.

As is detailed hereinbelow the present invention provides a reusable shrinkwrap material for sealing articles.

SUMMARY OF THE INVENTION

Generally stated, the present invention comprises:
(a) a pre-formed shell of heat shrinkable material conforming substantially to at least a portion of an article to be sealed, and
(b) means for releasing the material from the article after the shrinking thereof, and wherein the shrunken material may be re-used to re-seal the article.

The shell may be placed over the article anew and refastened and emplaced thereover via the means for releasing to enable re-use.

The material used for shrinkwrapping is any of the well known and commercially available materials used for shrinkwrapping, such as polyolefins, modified polyolefins, laminates and the like as disclosed in the prior art. The criticality attached to the material is its ability to be heat shrunk to form a shell and which will retain its shape when removed from the article it enshrouds.

For a more complete understanding of the present invention, reference is made to the following detailed description and accompanying drawing. In the drawing, like reference characters refer to like parts throughout the several views in which:

DESCRIPTION OF THE PREFERRED EMBODIMENT

Figure 1:
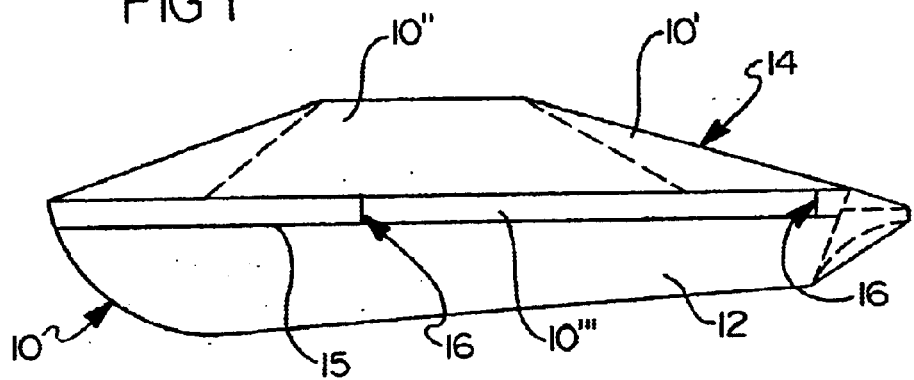
FIG. 1 is a perspective view of the reusable shrinkwrap material being applied to an aquatic vehicle.

As noted hereinabove the present invention defines a reusable shrinkwrap material and method of use therefor.

Generally stated, the present invention comprises:
(a) a pre-formed shell of heat shrinkable material conforming substantially to at least a portion of an article to be sealed, and
(b) means for releasing the material from the article after the shrinking thereof, and wherein the shrunken material may be re-used to re-seal the article.

Now, and with more particularity, and with reference to the drawing there is depicted therein a heat shrinkable material in accordance with the present invention and which is generally denoted at 10. As shown in the drawing the heat shrinkable material 10 comprises a shell which substantially corresponds in configuration to that of the article, or portion thereof, to be sealed. Herein, the article to be sealed is shown generally as a boat 12.

At the outset, it should be noted that although the article to be sealed is shown as a boat the present invention is applicable across a broad spectrum of articles. Thus, above ground swimming pools, spas, hot tubs, aircraft, automobiles, and the like may be sealed by using the present invention. Thus, it is to be understood that the present invention is not intended to be limited to the aquatic vehicle shown.

It is to be further stated at the outset hereof that in accordance herewith the shell, which is generally denoted at 14 is, preferably, pre-formed to substantially conform to the configuration of the article or portion of the article to be sealed. If the article is too big for a single sheet of material to be pre-formed, then, the pre-forming may be achieved by any suitable mode, such as by sewing, bonding, taping, gluing or the like of sections of heat shrinkable material together such as at 10', 10", 10'", etc., such that the sections when secured together conform to the article or portion of the article to be sealed.

Ordinarily, suitable securement devices or means for securing is associated with the shrinkwrap material hereof so that once the shell overlies the article or portion of the article to be sealed it can then be tied or otherwise secured thereto to hold the shell in place prior to being shrunk. Suitable means for securing include elastic cords of the type commonly known as bungee cords such as at 15, tie down straps, rope or the like which may be threaded through a suitable channel provided in the heat shrinkable material. This works particularly well with boats, aircraft, above-ground pools, spas, and the like. Of course other devices such as adhesive tape may be used for securement of the shell so long as it does not destroy the integrity of the shrinkwrap material when it is removed from the article.

In any event, though it is to be understood that in practicing the present invention and what is critical hereto is that there e a pre-formed shell of heat shrinkable Material which substantially conforms to and which can be rendered taut over the article or portion of the article to be sealed and which may be then secured thereto via the means for securing. As noted above, the means for securing must be non-permanent in the sense that it does not adhere to the sealed article or otherwise interfere with the integrity with the shrunken film so that the heat shrinkable material may be reused.

The heat shrinkable material which comprises the shell may be of any of the types well known and commercially available. Thus, the material may be a polyolefin film such as a polyethylene or it may comprise any of the well known and commercially available composites or laminates such as those materials defined in the aforementioned patents.

It is to be appreciated that in practicing the present invention that what is critical hereto is that the material be capable of being pre-formed into a shell and be conforming to the article or the portion of the article which is to be sealed by the heat shrinking of the material, and that upon subsequent removal after shrinking, that it retain its article-conforming shape.

In practicing the present invention, preferably, the material used herein is a laminate or composite of shrinkable film 20 to which is bonded or secured a non-woven fabric 22 via an adhesive 24 which is deposited either continuously or discontinuously onto the fabric and which is thereafter bonded to the film in the manner described in the patents referred to hereinabove.

In accordance herewith, and as noted hereinabove, the present invention further includes means for releasing the material after shrinkage thereof and which is denoted at 16.

Figure 2:
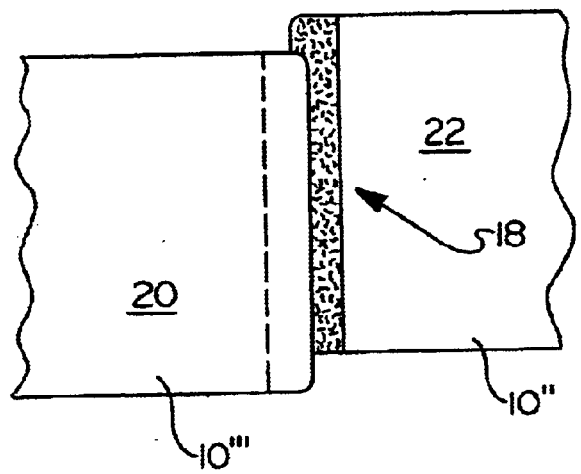
FIG. 2 is a perspective view of a portion of a shrinkwrap material contemplated for use herein.
Figure 3:
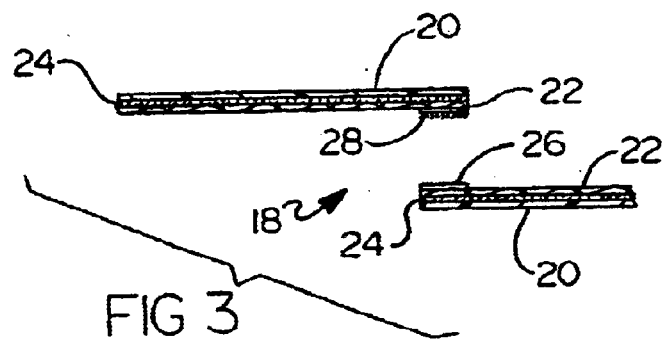
FIG. 3 is a cross-sectional view of the shrinkwrap material hereof taken along line 3—3 of FIG. 2.

The means for releasing is, preferably, incorporated into the material and is, preferably, integral therewith. The means for releasing may comprise any of a wide variety of well known and commercially available means such as a zipper, snaps, a buckle and clasp, a hook and loop fastener such as that sold commercially under the name VELCRO, interlocking plastic ridges and valleys such as that associated with commercial storage bags, for example those sold under the trademark ZIPLOC plastic bag or the like. Particularly preferred and as shown in FIG. 2, the means for releasing comprises a hook and loop fastener 18. Hook and loop fasteners are well known and commercially available and generally comprise co-operable and separate hook and loop members which may be meshed together to releasably hold two items together in the well known manner. Herein, and as shown in the drawing a first portion or section of the shell 14 has a first strip of hook and loop fastener 26 secured thereto such as by sewing or the like. A second section of the material 10 has a second strip 28 of hook and loop material which mates with the strip 22 in the well known manner. By providing at least one and preferably, a plurality of such means 16 disposed about the shell 14 of the material 10, the shell 14 can be removed or replaced after being shrink fitted to an article.

As noted above, in addition to the hook and loop fastener, any of a wide variety of other means for releasing may be used herein. Preferably, the means for releasing has a melting point which is higher than any temperature at which the material 10 is shrunk. In this way the integrity of the means for releasing remains intact. Alternatively, that area of the material 10 about the means for releasing 16 need not be shrunk if the melting point of the material 10 is too low, i.e. below, at or near the temperature at which the material is shrunk.

As stated above, the present invention is exemplified in the drawing through the use of a shell 14 of material 10 which enshrouds a boat 12. Thus, in using the present shrinkwrap material in connection with a boat, the shell is draped over the boat; pulled taut, and then secured to the boat via the means for securing. Beltings or strappings, shown at 30, if necessary to secure the shell to the boat are then emplaced and secured. Thereafter, the shell is heat shrunk by the application of heat thereto. The heat is applied to the entire film causing it to shrink. Essentially, the same procedure is used with other articles where the shell is draped over the article; secured thereto; shrunk, and is rendered re-useable thereafter.

In the case of a laminate material, the film will shrink at a faster rate than the non-woven fabric or woven fabric thus causing cushioning pockets to be formed between the article and the material. Because the integrity of the means for releasing remains intact, what is ultimately achieved is a heat shrunk film overlying and sealing the article.

To remove the now-shrunken shell, the means for releasing is activated, thereby separating sections or portions of the shell from each other thereby enabling the shell to be lifted off or removed from the article. The deformation of the heat shrinkable material remains, thus, retaining its configuration to the article which it enshrouded. Thereafter, the configured shell can be refitted to the article and secured thereto via the means for releasing.

It is to be appreciated from the preceding that the present invention provides a re-usable cover comprising the heat shrinkable material and the means for releasing.

It is apparent from the above that the term "shell" is meant a section or sections of material which loosely conform to the article or portion of the article it envelopes or enshrouds and which, upon subsequent application of heat thereto, conforms to the configuration of the article or portion of the article it overlays and which, upon removal retains a substantial conformation to the article or portion thereof to which it was heat shrunk.

The actual method for heat shrinking is well known to the skilled artisan and is described in the aforementioned prior art, the disclosures of the above-noted prior art being hereby incorporated by reference.

It is to be appreciated from the preceding that there has been described herein a novel heat shrinkable material of a pre-formed shell and means for releasing the shell from the article to be sealed and which retains the shape to which it is shrunken, after removal from the article, to thereby define a re-useable shrinkwrap cover or material.

Having, thus described the invention, what is claimed is:

1. A method for shrinkwrapping which comprises:
   (a) selecting a heat shrinkable material which can retain the shape to which it is shrunk,
   (b) affixing means for releasing thereto,
   (c) pre-forming a shell of at least two sheets of the material, the shell loosely conforming to the configuration of the article to be enshrouded therewith,
   (d) placing the shell over the article,
   (e) securing the means for releasing in place, and
   (f) heat shrinking the material.

2. The method of claim 1 which further comprises:
   (a) shrinking the material at a temperature below the melting point of the means for releasing.

3. The method of claim 2 which further comprises:
   (a) removing the shell from the article, and
   (b) replacing the shell over the article at a later time, and
   (c) re-fastening the means for releasing to re-seal the article.

4. The method of claim 3 wherein the means for releasing comprises a hook and loop fastener.

5. A method for shrinkwrapping an irregularly shared article which comprises:
   (a) selecting a heat shrinkable material which can retain the shape to which it is shrunk,
   (b) affixing means for releasing thereto,
   (c) pre-forming a shell of the material, the shell loosely conforming to the configuration of the irregularly shaped article to be enshrouded therewith,
   (d) placing the shell over the article,
   (e) securing the means for releasing in place, and
   (f) heat shrinking the material.

6. The method of claim 5 which further comprises:
   (b) shrinking the material at a temperature below the melting point of the means for releasing.

7. The method of claim 6 which further comprises:
   (a) removing the shell from the article, and
   (b) replacing the shell over the article at a later time, and
   (c) re-fastening the means for releasing to re-seal the article.

8. The method of claim 7 wherein the means for releasing comprises a hook and loop fastener.

* * * * *